United States Patent [19]

Streichenberger

[11] Patent Number: 4,950,104
[45] Date of Patent: Aug. 21, 1990

[54] ARTIFICIAL SUBSTRATES FOR MARINE BIOMASS ENHANCEMENT AND WAVE ENERGY ABSORPTION

[76] Inventor: Rodolphe Streichenberger, 301½ North Bay Front, Balboa Island, Calif. 92662

[21] Appl. No.: 392,055

[22] Filed: Aug. 10, 1989

Related U.S. Application Data

[63] Continuation-in-part of Ser. No. 35,449, Apr. 7, 1987, Pat. No. 4,872,782.

[51] Int. Cl.⁵ .......................... E02B 3/00; A01K 61/00
[52] U.S. Cl. .......................................... 405/24; 405/26; 119/3
[58] Field of Search .................... 405/23, 24, 26, 28, 405/21; 119/2–4

[56] References Cited

U.S. PATENT DOCUMENTS

| | | | |
|---|---|---|---|
| 310,551 | 1/1885 | Averell | 405/26 |
| 3,648,464 | 3/1972 | Edwards | 405/24 |
| 3,848,419 | 11/1974 | Bowley | 405/26 |
| 4,130,994 | 12/1978 | Van Moss | 405/24 |
| 4,264,233 | 4/1981 | McCambridge | 405/28 X |
| 4,337,007 | 6/1982 | Smith | 405/24 |

Primary Examiner—Dennis L. Taylor
Attorney, Agent, or Firm—Lyon & Lyon

[57] ABSTRACT

Artificial substrates for use in open sea enhancing biomass and/or absorbing wave energy, improved by means of particular dispositions and devices concerning their number, mooring, flotation, and using buried anchors and inertia weights. The artificial substrates are associated with affixed sessile organisms such as algae and shellfish and implanted securely even in very rough seas. The fulfill economical requirements for the development of aquacultural farms, aquacultural breakwaters, algae fields and shellfish reefs.

9 Claims, 3 Drawing Sheets

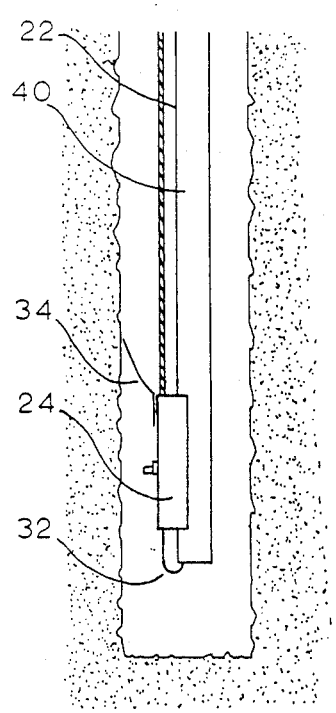
FIG. 4
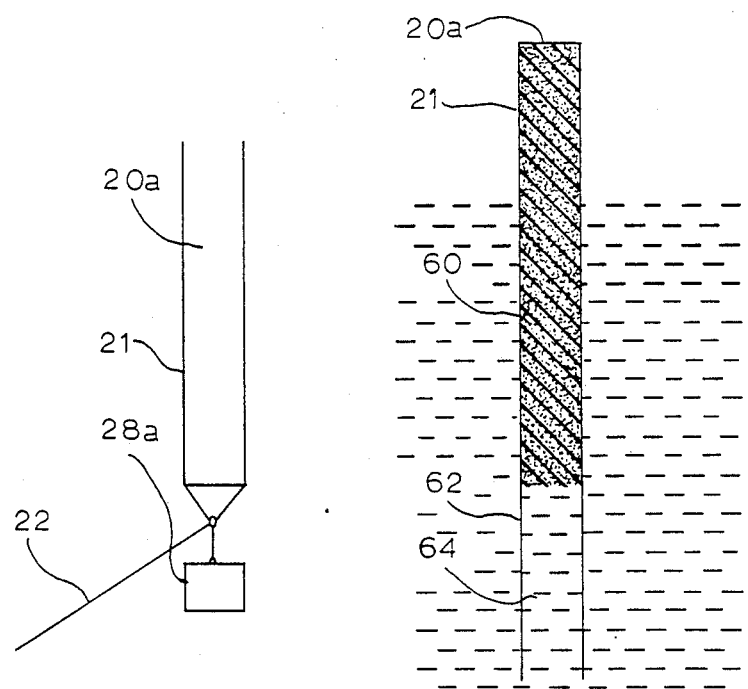
FIG. 7
FIG. 6
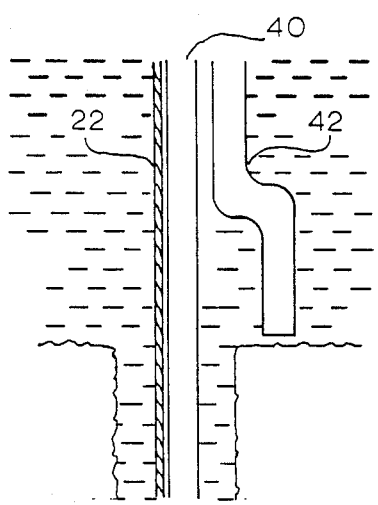
FIG. 5
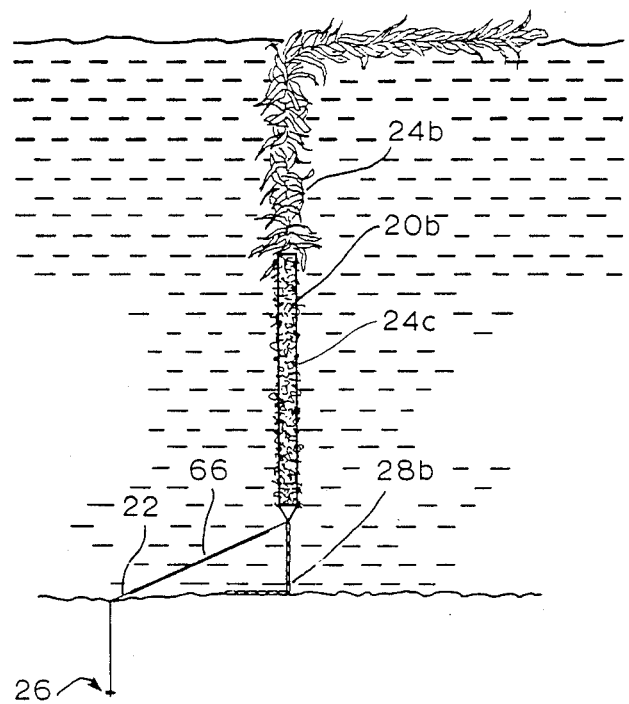
FIG. 8

ARTIFICIAL SUBSTRATES FOR MARINE BIOMASS ENHANCEMENT AND WAVE ENERGY ABSORPTION

This application is a continuation-in-part of application Ser. No. 07/035,449, filed Apr. 7, 1987, now U.S. Pat. No. 4,872,782.

BACKGROUND

In the oceans and notably on soft sea bottoms, the lack of hard substrates is often a limiting factor which prevents fishes and sessile organisms such as algae and shellfish to settle and develop even though the waters are fertile having sufficient light, minerals and plankton for their nurture. Moreover it has been demonstrated in the Applicant's previous works, that any immersed structure, natural or artificial, not only attracts the environmental biomass but is also a development factor for the biomass.

Hence, immersed structures, either natural, artificial, or a combination of both, have a great potential for the biomass enhancement of the oceans. The art of immersing, positioning and mooring artificial substrates, support-surfaces or structures, as well as the art of implanting algae fields and shellfish reefs, are now highly desireable matters for the restoration and development of biomass factors.

Heretofore artificial reefs have been utilized for sea enhancement purpose. These artificial reefs are typically large and heavy structures prefabricated on land. They are made out of concrete, rocks, iron, chains, plastics and other materials, immersed and settled into the sea at high costs. These artificial reefs aim to attract fish and give them new habitats.

Unlike artificial reefs, the artificial substrates, which will be described herein, are light and inexpensive structures with specific support-surfaces onto which natural structures of algae and shellfish affix and develop. These artificial substrates usually weigh hundreds or thousands of times less than artificial reefs. These artificial structures are easily handled and inexpensive and can affix large natural structures and such as giant algae and shellfish clusters which weigh hundreds or thousands of times more than the artificial structure itself. For a small artificial structure moored in the water, one obtains a great biomass productivity and sometimes a great wave energy absorption.

In his United States patent application Ser. No. 023,188, filed Mar. 3, 1987, now U.S. Pat. No. 4,854,774 Antonius Streichenberger describes such light and inexpensive artificial substrates with their implanting process and devices, for use on soft bottom in order to settle in open sea large algae and shellfish fields.

In 1979, and independent of any biomass consideration, the hydrodynamic effect and wave energy absorption of tethered buoys, floating near the water surface, have been described by some researchers, notably Richard Seymour University of California.

In 1984, and without considering artificial substrates, the wave energy absorption and tide deflection of natural algae fields have been described by some researchers, notably G.A. Jackson, University of California.

However, no one ever described the desireable characteristics of artificial substrates and associated sessile organisms for operating as biomass factors and/or wave energy absorbers.

OBJECTS AND ADVANTAGES

Accordingly the Applicant has recognized that certain types of artificial substrates, when associated with sessile organisms, substantially develop biomass and/or absorb wave energy. These artificial substrates and associated organisms stand closely, in great number and trustworthily in very rough waters. Their closeness, great number and trustworthiness in rough seas, are the difficult performances the present invention may accomplish.

Consequently, the present invention concerns beneficial devices, used separately or altogether, to ensure the moorings or to prevent encounters and entanglements or to speed the implantation of a great number of artificial substrates associated with sessile organisms, particularly algae and/or shellfish. The present invention includes several embodiments which may be employed separately or in combination, whereby the artificial substrates associated with sessile organisms have superior biomass productivity, superior wave energy absorption, and/or superior resistance to the wave activity.

According to a first embodiment of the present invention, the form of the artificial substrate is linear, in order to present minimal front surfaces to the water motion. The relationship between the length of the artificial substrate and its average section diameter is a ratio of about from 0.1 to 0.001. These artificial substrates are made of ropes, tubes, bars, and other lengthy and linear shapes. These linear artificial substrates, which stand vertically in the water column, place their support-surfaces and associated sessile organisms at different levels in the water where the sessile organisms can pick up their nutrients in a greater volume of water. For a major absorption of wave energy, as well as for a high biomass productivity, the artificial substrates and associated organisms have the advantage to stand in the superficial waters where light and energy are strong. An artificial substrate itself can stand in the lower part of the water column while the associated affixed organisms raise up above the artificial substrate, into the water column. The association of a small and low artificial substrate plus a great giant algae can occupy a great height in the water column.

To achieve what will be termed as an aquacultural breakwater, the association of linear artificial substrates and sessile organisms has to stand in the water column from the surface or below down to at least 5 meters deep, or down to 20 meters and more when the waves are great, since it is in the superficial waters that more light and energy are concentrated.

The associated sessile organisms affixed to the artificial substrates can be grown from natural implantation of mussels, for example, or from artificial implantation of oysters or giant algae, for example.

According to another embodiment of the present invention, the artificial substrates are moored closely on the water bottom, as trees in a forest. The optimum density of linear artificial substrates standing vertically in the water column, depends on both water fertility and waves activity. The breakwater effect is increased by high density. The aquacultural effect is increased by a medium density which promotes a whole vegetal and animal community of associated sessile organisms and also non-sessile organisms living in the immediate area, the value of the last happening to surpass the value of the first.

The density of an aquacultural breakwater is measured by dividing artificial substrate section surfaces by the total bottom surface covered by said artificial substrates. This quotient varies from 0.05 to 0.00025.

According to another embodiment of the present invention the artificial substrates are flexible. Under water motion, and for their best preservation, the artificial substrates have great advantage to tilt above their moorings from a vertical position to a bent position.

According to another embodiment of the present invention the artificial substrate's flotation is provided with greater inertia by means of weights placed under the linear support-surfaces of the artificial substrates. If the flotation means are partially emersed above the surface, the inertia increasing weights hang on under the linear support-surfaces. If the flotation means are entirely immersed under the surface, the inertia weights hang on the support-surfaces and partially lay on the water bottom.

The inertia effect of the weights substantially lessens the forces the artificial substrates and associated organisms exert on the moorings. It is a permanent advantage preventing moorings from attrition, sliding, extraction, or breakage. The weights also increase the vertical tension between the top and bottom of the support-surface lines. Such increased tension is an advantage which prevents there being encounters and entanglements between adjacent linear artificial substrates which are closely moored. Those inertia weights have doubled advantage as said above. However, under certain conditions and to prevent entanglements of weights into the mooring organs, it is sometimes useful to add rigid bars between the support-surface lines and the mooring organ of an artificial substrate.

In yet another embodiment of the present invention, when the mooring is on a soft bottom, a reversing anchor is deeply buried in the sediments. Also a fast refilling of the excavation dug for the mooring's burying, can be operated with a refilling pipe conveying pressurized air or water thereby collapsing the sediment sides of the excavated hole.

The reversing anchor is buried at a depth which is characterized by its relationship with the height of the artificial substrate plus the associated affixed sessile organisms. The ratio of the depth to height is selected between 0.02 and 2.

The reversing anchor adds a great strength to mooring organs which are subjected to enormous forces under big surge. The use of the reversing anchor and refilling pipe, separately or in combination reduce substantially the implanting process time. When implanting great numbers of artificial substrates the implanting process time can be reduced by half and more due to the possibility of withdrawing the excavating pipe immediately after excavation has ended, which is not the case with the process described in the U.S. patent application of Antonius Streichenberger, Ser. No. 023,188.

These new devices and methods comprise an important contribution for the development of artificial substrates the use of which has always been limited because of poor moorings, high drags and expensive implanting processes. Previously, artificial substrate use has been confined to protected areas for high value seafood aquaculture. The new purpose is to use improved artificial substrates in large quantities and in very rough seas as basic instruments for biomass enhancement and wave energy absorption. The artificial substrate's improvement, due to the present invention, will benefit sea biostructuring, a technology dealing with ecological, economical and humanitarian requirements. Such requirements include:

(1) Enhancement of the sea by means of living structures made of artificial substrates and associated affixed sessile organisms;
(2) Extension of the aquaculture to the open sea;
(3) Protection of the seashore against wave erosion;
(4) Creation in open sea of calm water areas protected by breakwater barriers where aquacultural, industrial and leisure activities can be developed;
(5) Aquaculture of simple technique for supplying new marine resources to underdeveloped populations with hunger problems; and
(6) Economical performances whereby a comparatively inexpensive breakwater is paid for by the aquacultural income of its own production.

Further objects and advantages of the present invention will be apparent from a consideration of the drawings and ensuing description.

SUMMARY OF THE INVENTION

The present invention relates to artificial substrates for use in open sea enhancing biomass and/or absorbing wave energy, improved by means of particular dispositions and devices concerning their number, mooring, flotation, and using buried anchors and inertia weights. The artificial substrates are associated with affixed sessile organisms such as algae and shellfish and implanted securely even in very rough seas. They fulfill economical requirements for the development of aquacultural farms, aquacultural breakwaters, algae fields and shellfish reefs.

BRIEF DESCRIPTION OF THE DRAWINGS

FIG. 4 shows a reversing anchor and an excavating pipe.

FIG. 5 shows an excavating pipe and a refilling pipe.

FIG. 6 shows artificial substrate's means of flotation.

FIG. 7 shows a hanging inertia weight.

FIG. 8 shows a chain-like inertia weight below a non emerging artificial substrate.

DETAILED DESCRIPTION OF PREFERRED EMBODIMENTS

Figure 1:
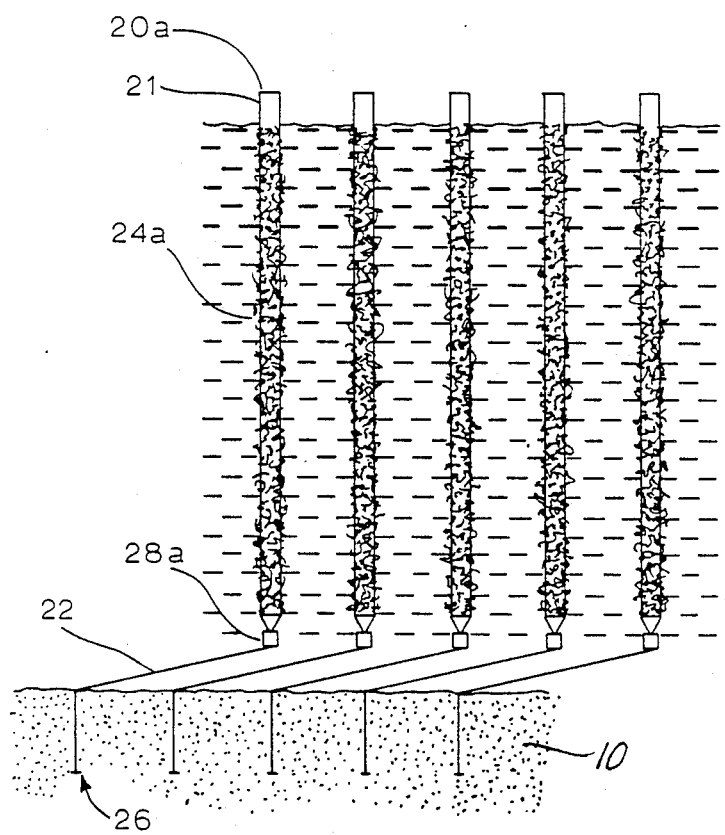
FIG. 1 shows five artificial substrates with associated sessile organisms and inertia weights.

FIG. 1 shows five artificial substrates 20a with associated sessile organisms 24a which belong to a large set of several hundreds of artificial and natural structures forming an aquacultural breakwater. The five units stand at low tide in a 18 meter deep sea with a tide of 4 meters.

Each linear artificial substrate is made of a mooring organ 22 and of a 35 centimeters diameter, 15 meters long polyethylene tube 20a of which the linear coefficient is 0.023.

This aquacultural breakwater density which is the quotient of the artificial substrate sections by the total bottom surface covered by said artificial and natural structures, is 0.01.

The polyethylene tube 20a forms the support-surfaces 21 for the fixation of associated organisms 24a which are, in the figured case, mussels weighing 375 Kilograms.

As shown in FIG. 6, each unit's flotation is assured by close cell foam 60 or air filling the inside said tube's upper part in the top 2.5 meters. Due to the holes 62 in tube 20a beneath the foam 60, water 64 fills the tube's inside all along the remaining 12.5 meters of the tube. Flotation may also be accomplished by enclosed air.

As shown in FIG. 1 and FIG. 7, the polyethylene tube 20a is attached at its base to the mooring organ 22 consisting of a 25 millimeters diameter and 9 meter long nylon rope of which 3 meters are buried in the sediments.

Figure 2:
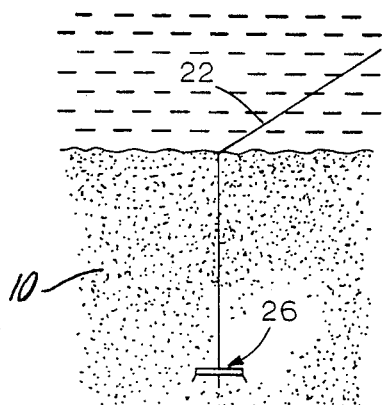
FIG. 2 shows an artificial substrate's mooring with a reversing anchor.
Figure 3:
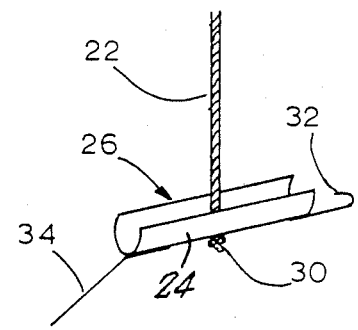
FIG. 3 shows a reversing anchor.

As shown in FIG. 1, FIG. 2, and FIG. 3, at the end of mooring rope 22 is attached a reversing anchor 26 which is 35 centimeters long and 7 centimeters wide. The reversing anchor 26 is comprised of a half cylinder piece 24 which may be constructed out of galvanized carbon steel.

As shown in FIG. 1 and FIG. 7, between the base of the polyethylene tube 20a and the mooring organ 22 hangs thereon a 100 Kilograms inertia weight 28a which may be constructed out of cast-iron.

FIG. 2 shows the lower part of the artificial substrate's mooring organ which is buried in sediments. The mooring rope 22 is held into the sediments by a reversing anchor 26 the position of which is perpendicular to applied extraction forces.

FIG. 3 shows the reversing anchor 26 tied to a mooring rope 22 which passes through the middle of the reversing anchor 26 and is stopped on one side by a knot 30 which makes a hinging bond between the rope 22 and the reversing anchor 26. On one extremity of the reversing anchor 26 is a hook 32 and on the other extremity is an antenna 34. The reversing anchor 26 is an anti-extraction device of artificial substrates' mooring organs. Its half-cylindrical shape corresponds to the cylinder shape of the excavating pipe 40 (as shown in FIG. 4) along which it is placed during the burying phase. The hook 32 is provided for catching into the end of the excavating pipe 40 during the burying. The antenna 34 is provided for driving in and keeping contact with the sediment sides of the excavated hole as shown in FIG. 4.

FIG. 4 shows the inside an excavated hole, of the mooring system with a mooring rope 22, reversing anchor 26, hook 32, antenna 34, and with the excavating means which is a pipe 40 conveying pressurized air or water.

While digging a hole in the sediments, by means of air or water jet effect, the excavating pipe 40 goes down into the sediments drawing with itself the artificial substrate's mooring organ comprising rope, reversing anchor 26, antenna 34 and hook 32. Due to said hook 32 caught in the end of excavating pipe 40, the whole mooring organ sunk into the hole with the excavating pipe 40. During excavation, the antenna 34 keeps contact and drives in the sediment sides of the hole. The length of the antenna 34 is long enough to keep permanent contact with the side of the hole, the wideness of the hole being relatively constant under either air or water jet conditions. The antenna 34, made of fiber glass for example, is thin and flexible enough to bend in a curve when driving in the sides of the hole. However, the antenna 34 is rigid enough to prevent the mooring rope 22 from pulling back the reversing anchor 26 when the excavating pipe 40 is withdrawn after the excavating is completed. This means exactly that the rigidity of the antenna 34 is superior to the breakage point of the bond which attaches the rope 22 to the excavating pipe 40, this bond being made for example of thin rubber thread and placed at the head of the pipe 40. Due to this arrangement, the antenna 34, which acts as the first anti-extraction force of the mooring organ and turns the reversing anchor 26 from its vertical burying position towards a position perpendicular to the vertical, thereby providing orientation with a full anti-extraction strength, the excavating pipe 40 can be withdrawn immediately after completion of the excavation without incurring the risk of pulling back the mooring organ off the sediments.

FIG. 5 shows an upper portion of the excavating pipe 40 with the mooring rope 22, which are near the sedimentary bottom and are provided with a juxtaposed refilling pipe 42 conveying pressurized air or water.

When excavating has ended, the pressurized air or water being forced through the said excavating pipe 40 is stopped and refilling pipe 42 starts blowing pressurized air or water on the upper sides of the excavated hole, causing the immediate collapse of the sediments down to the bottom of the hole, thereby accelerating the refilling of the hole with sediment, which otherwise in natural way takes several seconds or minutes.

These devices of the reversing anchor and refilling pipe can be operated separately or altogether. They can cut by half and more the implanting time otherwise necessary. In the application of Antonius Streichenberger, U.S. Ser. No. 023,188, for example, the process implanting time is substantially handicapped by waiting for the hole's sides natural collapsing and refilling, before which the forseen anti-extraction devices become efficient.

FIG. 8 shows a tube-like artificial substrate 20b which is entirely immersed in a 15 meters deep sea at low tide, and which is surmounted by an associated sessile organism, the Macrocystis giant algae 24b, emerging at the water surface. At high tide, the flotation level of the tube-like artificial substrate is the same as that at low tide, but the flotation of the giant algae 24b rises up with the tide, so that the artificial substrate and associated sessile organisms are permanently standing all along the water column from the water surface down to the base of the artificial surface.

The inertia weight is comprised of a chain 28b hanging on the artificial substrate and partially laying on the bottom. The chain 28b stabilizes the floating level of this artificial substrate and associated sessile organisms, algae 24b and mussels 24c.

A rigid bar 66 may secure along the mooring rope 22 to prevent entanglement between the mooring rope 22 and the chain 28b or other substrated moored nearby.

Figure 9:
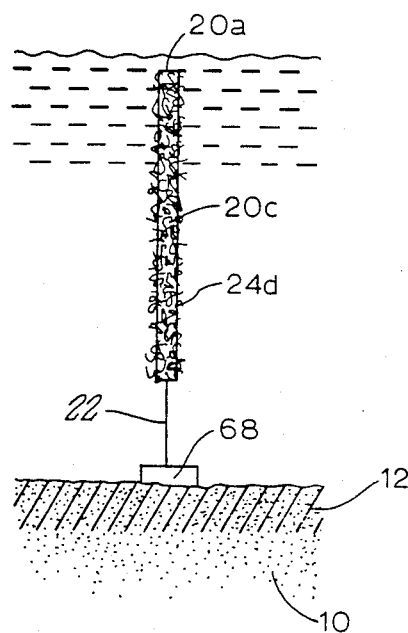
FIG. 9 shows an artificial substrate with associated sessile organisms and without an inertia weight.

The mooring system shown in FIG. 1 is buried in the sea bottom with the reversing anchor 26. However the mooring system illustrated in FIG. 1 has been designed for an aquacultural breakwater having a sediment bottom 10. When the mooring rope 22 is to be moored on a rocky bottom for example, other traditional moorings such as concrete blocks, or other mooring means may be substituted. Such a design is illustrated in FIG. 9 where a rocky bottom 12 would inhibit easy insertion of the mooring device. In such a location, a heavy anchor such as concrete block 68 may be attached to the mooring rope 22 to anchor the artificial substrate to the rocky sea floor 12.

The tube-like artificial substrate 20a of FIG. 9 is shown to stand without inertial weight (no chain), with cell foam and/or air providing flotation means which provide high bouyancy to the device floating vertically and under high tension on to the mooring block 68. Alternately, an attachment means may be provided for securement to an existing structure on the sea bottom.

FIG. 9 also illustrates the substrate 20a being positioned next to the surface (at low tide). The depth of the substrate 20a may be selected to obtain optimal light, nutrient, and water surge quality for the particular application. Other application such as for hydrodynamic effect (such as for a breakwater) may locate the substrate away from the surface and near the sea bottom.

Figure 10:
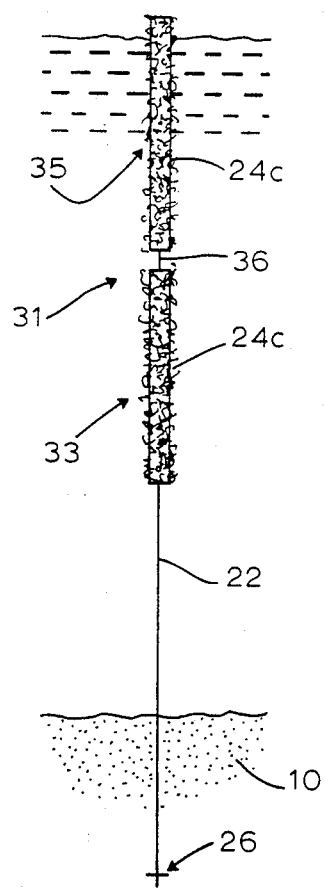
FIG. 10 shows a two-part flexible substrate at high tide.
Figure 11:
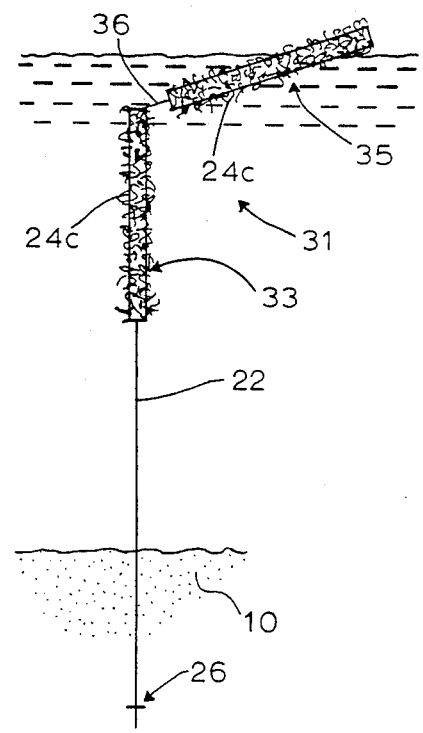
FIG. 11 shows a two-part flexible substrate at low tide.

FIG. 10 and FIG. 11 illustrate an alternative embodiment comprising a flexible artificial substrate 31 secured to the sea bottom 10 by mooring rope 22 and anchor 26. The flexible artificial substrate 31 is comprised of a plurality of tubes, the lower tube 33 being connected by a flexible connector 36 to an upper tube 35. Sessile organisms 24c are attached to both tubes 33 and 35.

The lower tube 33 is filled with a bouyant material (such as air or close cell foam) so that it has excess bouyancy in order to stand vertically underwater. The upper tube 35 is also filled with bouyant material, but preferable has bouyant material only in its upper portion. The bouyant material in the upper portion of the upper tube 35 may have to be a nonleaking material such as plasic foam or the like.

The flexible connector 36 allows the flexible substrate 31 (shown at high tide in FIG. 10 to be completely vertical) to flex such that the upper tube 33 becomes inclined at low tide as shown in FIG. 11. Such a flexible system allows a larger portion of artificial substrate (i.e. upper tube 35) to be positioned near the water surface where there are greater amounts of sunlight and certain nutrients as well as greater capacity for wave energy absorption at both low and high tide.

The implantation density of a forest of flexible artificial substrates may be set such that distance between adjacent substrates planted in rows is 3 to 5 times the diameter of the tubes 33 or 35 and the distance between adjacent rows may be equal to the length of the upper tube 35.

The flexible artificial substrate 31 enjoys the advantages of artificial substrates described above while mimicking the action of sea organisms such as kelp. Kelp will grow toward the ocean surface with its portion rising and falling with the tides.

Thus it is apparent that the artificial substrates according to the present invention provide highly reliable yet economical devices which can be used to develop biomass and/or absorb wave energy.

While the above description contains many specificities, these should not be construed as limitations on the scope of the invention, but rather as an exemplification of preferred embodiments thereof. For example, the artificial substrates may be used in freshwater lakes and rivers; the artificial substrates plus associated sessile organisms can be centimeters or deca meters high; the artificial substrates may be the only substrates on which are affixed solid shellfish reefs or flexible algae fields.

The invention is expected to serve the needed development of a sea bio-structuring technology.

Accordingly, the scope of the invention should be determined not by the embodiments illustrated but by the appended claims and their legal equivalents.

I claim:

1. An artificial substrate comprising:
a first bouyant tube having a first end and a second end, the first end being connected by a flexible line to a bottom mooring, the first bouyant tube and the flexible line having lengths such that the first bouyant tube floats in a vertical orientation in a positioned permanently below lowest water level;
a second bouyant tube having a first end and a second end, the first end being connected by a flexible connector to the second end of said first bouyant tube, the flexible connector and the second bouyant tube having lengths such that the second bouyant tube floats (a) in a substantially vertical orientation with its second end at or just below water surface at high water level and (b) in an inclined orientation at low water lever; and
sessile organisms attached to the first and second bouyant tubes.

2. The artificial substrate of claim 1 wherein portions of the bouyant tubes are bouyant and portions of the bouyant tubes are nonbouyant.

3. The artificial substrate of claim 2 wherein bouyant portions of the bouyant tubes are positioned in the second end of the bouyant tube.

4. An artificial substrate for growing sessile organisms thereon, comprising:
a first bouyant tube connected at a first end by a flexible line to a bottom mooring, the first bouyant tube having an outer surface selected to facilitate attachment of sessile organisms;
a second bouyant tube connected to a second end of the first bouyant tube; and
means for flexibly connecting the first bouyant tube to the second bouyant tube,
wherein the second bouyant tube is arranged and constructed such that it stands vertical at high water level and is inclined at low water level.

5. The artificial substrate of claim 4 wherein said bottom mooring comprises an anchor which may be buried in a sea bottom.

6. The artificial substrate of claim 4 wherein said bottom mooring comprises a heavy block which may be lowered onto a sea bottom.

7. The artificial substrate of claim 4 wherein said bottom mooring comprises an attachment means to an existing structure on a sea bottom.

8. The artificial substrate of claim 4 wherein portions of the bouyant tubes are bouyant and portions of the bouyant tubes are nonbouyant.

9. The artificial substrate of claim 8 wherein bouyant portions of the bouyant tubes are positioned in the second end of the bouyant tube.

* * * * *